(12) United States Patent
Inbe et al.

(10) Patent No.: US 7,503,381 B2
(45) Date of Patent: Mar. 17, 2009

(54) SURFACE TREATMENT METHOD FOR FLUX-BRAZED ALUMINUM-MADE HEAT EXCHANGER

(75) Inventors: Toshio Inbe, Tokyo (JP); Norizumi Matsui, Tokyo (JP); Kengo Kobayashi, Aichi (JP); Osamu Kasebe, Aichi (JP)

(73) Assignees: Nippon Paint Co., Ltd., Osaka (JP); Denso Corporation, Aichi (JP)

( * ) Notice: Subject to any disclaimer, the term of this patent is extended or adjusted under 35 U.S.C. 154(b) by 410 days.

(21) Appl. No.: 11/196,292

(22) Filed: Aug. 4, 2005

(65) Prior Publication Data

US 2006/0027629 A1    Feb. 9, 2006

(30) Foreign Application Priority Data

Aug. 6, 2004    (JP) .............................. 2004-230166

(51) Int. Cl.
*C23F 11/10*    (2006.01)

(52) U.S. Cl. .......... 165/134.1; 165/133; 165/DIG. 512; 165/DIG. 513; 165/DIG. 514; 252/388; 252/387; 428/457; 427/409; 427/388.2

(58) Field of Classification Search ................ 428/457; 252/388, 387; 165/133, 134.1, DIG. 513, 165/DIG. 514, DIG. 512; 427/409, 388.2
See application file for complete search history.

(56) References Cited

U.S. PATENT DOCUMENTS

| | | | | |
|---|---|---|---|---|
| 3,909,200 A | * | 9/1975 | Redmore | 422/16 |
| 4,479,917 A | * | 10/1984 | Rothgery et al. | 422/16 |
| 5,549,927 A | * | 8/1996 | Cottone et al. | 427/191 |
| 6,659,171 B2 | * | 12/2003 | Inbe et al. | 165/133 |

FOREIGN PATENT DOCUMENTS

| | | |
|---|---|---|
| EP | 1245622 A1 | 10/2002 |
| EP | 1447460 A1 | 8/2004 |
| GB | 1045684 | 10/1966 |
| JP | 2003/003282 | 1/2003 |

OTHER PUBLICATIONS

European Search Report; Oct. 28, 2005 for App. No. 05016271.8-2301 PCT.

* cited by examiner

*Primary Examiner*—Kiley Stoner
*Assistant Examiner*—Erin B Saad
(74) *Attorney, Agent, or Firm*—Antonelli, Terry, Stout & Kraus, LLP.

(57) ABSTRACT

There is disclosed a rust prevention and hydrophilization treatment method for a flux-brazed aluminum-made heat exchanger which comprises subjecting the same to a rust prevention treatment by the use of a zirconium base compound and/or a titanium base compound, and thereafter subjecting the same to a hydrophilization treatment by means of a hydrophilization treatment agent composition containing the under-mentioned components:
(1) 40 to 90% by mass of polyvinyl alcohol having a degree of saponification of at least 90%;
(2) 3 to 40% by mass of polyoxyalkylene-modified polyvinyl alcohol in which 0.01 to 20% of pendant groups are polyoxyalkylene ether groups;
(3) 1 to 30% by mass of an inorganic cross-linking agent which reacts with hydroxyl groups of the polyvinyl alcohol and modified polyvinyl alcohol; and
(4) 1 to 20% by mass of a guanidine compound and/or a salt thereof.

The above simplified method dispenses with a flux removal step without causing wastewater treatment problems, and thus assures favorable rust prevention and deodorization effects.

9 Claims, No Drawings

SURFACE TREATMENT METHOD FOR FLUX-BRAZED ALUMINUM-MADE HEAT EXCHANGER

BACKGROUND OF THE INVENTION

1. Field of the Invention

The present invention relates to a method for rust prevention and hydrophilization treatment of the surfaces of a flux-brazed aluminum-made heat exchanger, which method is capable of imparting the surfaces thereof with excellent deodorization effect in addition to favorable rust prevention and hydrophilization effect.

2. Description of the Related Arts

A heat exchanger to be used for car air conditioners is constructed in such a complicated manner that aluminum-made fins are held usually at small spacing in order to make the most of the surface area of the heat exchanger, and further aluminum tubes for supplying the fins with a cooling medium are intricately arranged. Moisture in the air which is attached to the surfaces of the fins as condensate during the operation of an air conditioner becomes water droplets of almost semi-spherical shape on the surfaces of the fins that are inferior in wettability, and the resultant condensate resides in the form of bridge among the fins, thereby preventing smooth flow of suction air and increasing draft resistance in the heat exchanger. It follows that the inferior wettability or water repellency of the surfaces of fins deteriorates the heat exchange efficiency.

In addition, although aluminum and an alloy thereof are inherently excellent in corrosion resistance, when condensate resides on the surfaces of the fins for a long time, oxygen concentration cells are formed or pollutants in the air are gradually attached thereto and concentrated, thus promoting hydration or corrosion reaction. The corrosion products deposit on the surfaces of the fins, impair heat exchange characteristics and besides, during heating operation in winter are made into white particulate and exhausted along with warm air through a fan.

In order to improve the above-mentioned problems, there are proposed various surface treatment agents and surface treatment methods for the purpose of imparting hydrophilicity, wettability, corrosion resistance, deodorization properties and the like to the surfaces of the aluminum fins. There are exemplified, for instance, the surface treatment agents composed of a mixture of hydrophilic resins such as polyvinyl alcohol, polyvinyl pyrrolidone, water-soluble nylon and a water-soluble phenolic resin (JP5-302042A); those composed of specific modified polyvinyl alcohol, a phosphorus compound salt and/or a boron compound salt and the like (JP2003-003282A).

On the other hand, an aluminum-made heat exchanger is assembled by joining a large number of aluminum fins and aluminum tubes as mentioned above, but the fins and tubes cannot be readily bonded by brazing, soldering and the like that are other than a mechanical bonding method, since the surfaces of aluminum are covered with strong dense oxide films, whereby as a brazing method, a VB method (vacuum brazing method) comprising brazing under vacuum has hitherto been put into practice.

However, a halogen base flux has recently been developed as means for effectively removing and destroying the oxide films, and thus a flux brazing typified by NB method (Nocolock method) comprising brazing in an atmosphere of nitrogen has been prevailingly employed by reason of easy management of brazing, inexpensive furnace, inexpensive brazing processing and the like factors.

Nevertheless the NB method involves a problem in that a flux, which remains on the surfaces of aluminum, results in non-uniform surface conditions, and makes it impossible to achieve uniform surface treatment by a chemical conversion treatment, a hydrophilization treatment and the like, thereby causing insufficient corrosion resistance, adhesiveness and the like.

Under such circumstances, in regard to the surface treatment of a flux-brazed aluminum-made heat exchanger, there are presently carried out in turn (1) flux removal step, (2) chemical conversion treatment step (rust prevention step) and (3) hydrophilization treatment step. However the treatment method just mentioned involves the problems of too many steps, and besides the generation of halogen-based wastewater in the flux removal step. Moreover, flux removal step, in which etching is conducted with an acid and/or an alkali to enhance chemical conversion treatment properties, also involves a problem in that the flux cannot be removed alone, thus making it impossible to achieve uniform chemical conversion treatment owing to the occurrence of excessive etching to expose silicon in a brazing material (Al/Si).

Furthermore, $Cr^{6+}$ free chemical conversion treatment, which is made necessary from the safety problem of human bodies, is insufficient in corrosion resistance.

SUMMARY OF THE INVENTION

Under such circumstances, an object of the invention is to provide a method which comprises simplified rust prevention and hydrophilization treatment for a flux-brazed aluminum-made heat exchanger, which dispenses with flux removal step, and is free from wastewater treatment problem originating therefrom, which consequently is subjected to sufficient rust prevention and hydrophilization treatment, and which is capable of affording an aluminum-made heat exchanger imparted with excellent deodorization effect.

Other objects of the present invention will become obvious from the text of this specification hereinafter disclosed.

In order to achieve the above-mentioned object, intensive extensive research and investigation were made in various ways. As a result, it has been discovered that the objects can be achieved by subjecting an aluminum-made heat exchanger to direct rust prevention treatment (chemical conversion treatment) by the use of a zirconium base compound and/or a titanium base compound, while omitting the flux removal step, and thereafter subjecting the same to rust prevention and hydrophilization treatment by means of a hydrophilization treatment agent composition containing a specific hydrophilic resin and a rust preventive component, in the rust prevention and hydrophilization treatment for flux-brazed aluminum-made heat exchanger.

That is to say, the present invention provides a rust prevention and hydrophilization treatment method for a flux-brazed aluminum-made heat exchanger which comprises subjecting the heat exchanger to a rust prevention treatment by the use of a zirconium base compound and/or a titanium base compound, and thereafter subjecting the heat exchanger to a hydrophilization treatment by means of a specific hydrophilization treatment agent composition. The above-mentioned hydrophilization treatment agent composition contains the under-mentioned components:

(1) 40 to 90% by mass of polyvinyl alcohol having a degree of saponification of at least 90%;

(2) 3 to 40% by mass of polyoxyalkylene-modified polyvinyl alcohol in which 0.01 to 20% of pendant groups are polyoxyalkylene ether groups;

(3) 1 to 30% by mass of an inorganic cross-linking agent which reacts with hydroxyl groups of the polyvinyl alcohol and modified polyvinyl alcohol; and (4) 1 to 20% by mass of a guanidine compound and/or a salt thereof.

The coating weight of the above-mentioned hydrophilization treatment agent composition is preferably 0.01 to 5 g/m².

The present invention also provides a flux-brazed aluminum-made heat exchanger subjected to rust prevention/hydrophilization treatment by the foregoing method.

DESCRIPTION OF THE PREFERRED EMBODIMENTS

The subject of the rust prevention and hydrophilization treatment in the present invention is a flux-brazed aluminum-made heat exchanger.

Herein, the aluminum-made heat exchanger include an evaporator, radiator, condenser and the like that are made of aluminum and/or aluminum alloys as raw materials, particularly a car evaporator for automobiles as a principal subject. The flux-brazing, as mentioned above, is a method for bonding aluminum fins, aluminum tubes and the like by the use of a brazing material such as Al/Si to assemble the aluminum-made heat exchanger, and is carried out in a nitrogen gas by using a halogen base flux in order to effectively remove and destroy oxide films or prevent oxide films from forming.

The flux is dissolved in water into the form of slurry, stuck to a heat exchanger, completely dried, and then inserted in a brazing furnace which has been purged with nitrogen gas. The amount of the flux to be stuck thereto is usually 1 to 10 g/m², approximately.

The (halogen base) flux to be used in NB method which is a typical flux brazing method is [$KAlF_4+K_3AlF_6$]. In the NB method, at least one portion of a material to be brazed comprises an Al/Si brazing material, and at least one portion of a material to be brazed is coated with a fluorine base flux, while raising the furnace temperature up to a brazing temperature. The flux begins to melt at about 562° C., when aluminum oxide film and the like are destroyed, so that the surfaces of the heat exchanger are made active. When the temperature is raised up to about 588° C., the Al/Si brazing material is molten, whereby brazing with the Al/Si brazing material takes place.

The rust prevention and hydrophilization treatment method for an aluminum-made heat exchanger in the present invention is characterized in that by omitting the flux removal step, the heat exchanger is subjected to a rust prevention treatment through a zirconium base compound and/or a titanium base compound and thereafter to a rust prevention, hydrophilization and deodorization treatment by the use of a hydrophilization agent composition containing a specific hydrophilic resin and a rust preventive component.

Examples of the zirconium base compounds to be used for rust prevention in the present invention include zirconium compound such as fluorozirconic acid and zirconium fluoride, and zirconium salts of lithium, sodium, potassium, ammonium and the like. The zirconium base compounds are each dissolved in water to prepare a chemical conversion treatment solution containing zirconium ions as active species. Alternatively a zirconium compound such as zirconium oxide may be dissolved in a fluoride such as hydrofluoric acid.

Examples of the titanium base compounds to be used for rust prevention in the present invention include titanium compound such as titanic acid and titanium fluoride, and titanium salts of lithium, sodium, potassium, ammonium and the like. The titanium base compounds are each dissolved in water to prepare a chemical conversion treatment solution containing titanium ions as active species. Alternatively a titanium compound such as titanium oxide may be dissolved in a fluoride such as hydrofluoric acid.

The zirconium base compounds and the titanium base compounds may be used together for rust prevention in the present invention. The ratio of the zirconium base compounds and the titanium base compounds, as ratio of zirconium ion: titanium ion, is preferably 1:1 to 3:1.

The chemical conversion treatment solution of zirconium base compound and/or a titanium base compound has total concentration of zirconium ion and/or titanium ion in the range of preferably 10 to 10,000, more preferably 100 to 1,000.

The amount of the zirconium film and/or the titanium film on the metallic surface of the flux-brazed aluminum-made heat exchanger is preferably 1 to 300 g/m², more preferably 3 to 100 g/m².

The above-mentioned chemical conversion treatment solution according to the present invention has pH preferably in the range of 1 to 5. The pH thereof, when being less than 1, brings about excessive etching failing in depositing a zirconium film or a titanium film, whereas the pH when being more than 5, leads to failure to deposit sufficient zirconium film or titanium film due to insufficient etching, thus deteriorating rust prevention properties. The solution of zirconium has pH more preferably in the range of 2.5 to 4.5.

The chemical conversion treatment solution according to the present invention may contain, in addition to the above-mentioned zirconium base compounds and titanium base compound, metallic ions of such as titanium, manganese, zinc, cerium, vanadium and tervalent chromium, a rust prevention agent such as a phenolic resin to enhance rust prevention properties, a silane coupling agent to enhance adhesiveness and phosphoric acid or the like to enhance reactivity of the chemical conversion treatment.

The chemical conversion treatment method using the chemical conversion treatment solution according to the present invention is not specifically limited, but may be any of spraying method, immersion method and the like method.

The temperature of the solution in this case is in the range of preferably 10 to 80° C., more preferably 30 to 70° C.

In the present invention, the hydrophilization treatment agent composition to be used for rust prevention and hydrophilization treatment after the chemical conversion treatment (rust prevention treatment) by the zirconium ions and/or the titanium ions contains a specific hydrophilic resin and rust prevention component as described hereunder.

(1) Polyvinyl Alcohol Having a Degree of Saponification of at Least 90%:

In the hydrophilization treatment agent composition according to the present invention, use is made as one of hydrophilic resins, of polyvinyl alcohol having a degree of saponification of at least 90%. The above-mentioned polyvinyl alcohol, which inherently has the performance of imparting hydrophilicity, is a hydrophilic resin having high water resistance in comparison with the under-mentioned polyoxyalkylene-modified polyvinyl alcohol, is capable of densely coating aluminum fins, and is highly effective in deodorization and suppression of adhered odor owing to the high water resistance. The degree of saponification thereof is preferably at least 95%. The degree of saponification, when being less than 90%, results in poor hydrophilization. The number-average molecular weight of the polyvinyl alcohol mentioned above is in the range of preferably 1,000 as the lower limit to 1,000,000 as the upper limit. The number-average molecular weight thereof, when being less than 1,000, brings about inferior film forming properties, poor hydrophilicity and inferior other physical properties of the film, whereas the same, when being more than 1,000,000, gives rise to unreasonably high viscosity of the chemical conversion treatment solution to be prepared, thereby causing inferior workability and physical properties of the film. It being so, the lower limit is preferably 10,000, while the upper limit is preferably 200,000.

In the present invention, the above-mentioned polyvinyl alcohol is used in the range of 40 to 90% by mass, preferably 50 to 80% by mass in the hydrophilization treatment agent composition.

(2) Polyoxyalkylene-modified Polyvinyl Alcohol Having a Degree of Modification (Ratio of Polyoxyalkylene Groups in the Pendant Groups) in the Range of 0.01 to 20%:

In the hydrophilization treatment agent composition relating to the present invention, use is made, as a hydrophilic resin, of polyoxyalkylene-modified polyvinyl alcohol wherein 0.01 to 20% of the pendant groups are polyoxyalkylene ether groups represented by following general formula (1) in addition to the above-described polyvinyl alcohol having a degree of saponification of at least 90%.

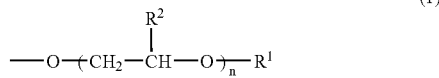
(1)

wherein n is an integer form 1 to 500; $R^1$ is a hydrogen atom or an alkyl group having 1 to 4 carbon atoms; and $R^2$ is a hydrogen atom or a methyl group.

In the above-mentioned polyoxyalkylene-modified polyvinyl alcohol, polyoxyalkylene-modifying groups preferably occupy 0.1 to 5% in the pendant groups, the degree of polymerization (n) of the polyoxyalkylene groups is preferably in the range of 3 to 30, and the content of the polyoxyalkylene groups is preferably in the range of 50 to 100%.

The polyoxyalkylene-modified polyvinyl alcohol plays a role in particular of imparting hydrophilicity in the hydrophilization treatment agent composition according to the present invention, because of hydrophilicity of the polyoxyalkylene groups.

The polyoxyalkylene-modified polyvinyl alcohol is used in an amount in the range of preferably 3 to 40%, more preferably 5 to 30% by mass of the hydrophilization treatment agent composition.

The blending ratio of the polyvinyl alcohol having a degree of saponification of at least 90% to the polyoxyalkylene-modified polyvinyl alcohol is in the range of preferably 10:1 to 1:1, more preferably 5;1 to 2:1.

(3) An Inorganic Cross-linking Agent Which Reacts with Hydroxyl Groups of the Polyvinyl Alcohol and Modified Polyvinyl Alcohol:1 to 30% by Mass:

Since the above-mentioned (modified) polyvinyl alcohol and particularly the polyoxyalkylene-modified polyvinyl alcohol that are contained in the hydrophilization treatment agent composition of the present invention have high hydrophilicity, an inorganic cross-linking agent which reacts with hydroxyl groups of the (modified) polyvinyl alcohol is added for the purpose of enhancing the water resistance of the hydrophilization treatment agent composition of the present invention. Examples of the inorganic cross-linking agent include phosphate of Ca, Al, Mg, Fe and Zn, compounds of condensed phosphate, silica compounds such as silicon dioxide and zirconium base compounds such as zirconyl carbonate ammonium.

The inorganic cross-linking agent is used in an amount in the range of 1 to 30%, preferably 3 to 20% by mass based on the hydrophilization treatment agent composition. The content of the inorganic cross-linking agent is in the range of 10:1 to 1:3, preferably 5:1 to 1:2 based on the whole blending amount of the (modified) polyvinyl alcohol.

(4) A Guanidine Compound and/or a Salt Thereof: 1 to 20% by Mass:

The hydrophilization treatment agent composition of the present invention is characterized by containing a guanidine compound and/or a salt thereof which is represented by the following general formula (2), and which has excellent rust prevention effect

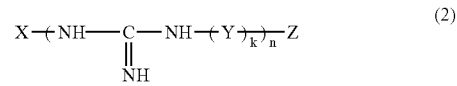
(2)

wherein Y denotes —C(=NH)—$(CH_2)_m$—, —C(=O)—NH$(CH_2)_m$—, or —C(=S)—NH$(CH_2)_m$—; m is an integer from 0 to 20; n is a positive integer k is 0 or 1; X is a hydrogen atom, an amino group, a hydroxyl group, methyl group, phenyl group, chlorophenyl group or methylphenyl group (tolyl group); Z is a hydrogen atom, an amino group, a hydroxyl group, methyl group, phenyl group, chlorophenyl group, methylphenyl group(tolyl group) or a polymer which is represented by the general formula (3)

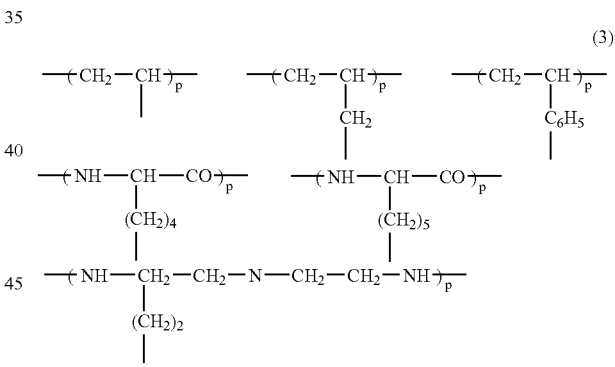
(3)

wherein p denotes an integer, and which has a mass average molecular weight in the range of 200 to 1,000,000.

In the present invention, a flux-brazed aluminum-made heat exchanger is subjected to a rust prevention treatment by using a zirconium base compound and/or a titanium base compound, and thereafter is treated with the hydrophilization treatment agent composition containing a guanidine compound and/or a salt thereof, whereby it follows that two steps of rust prevention treatments are carried out. Consequently even if a flux removal step is omitted to cause a state that fluxes remain, all surfaces of an aluminum-made heat exchanger results in success in attaining sufficient rust prevention effect.

The above-mentioned guanidine compound and/or a salt thereof are not specifically limited, but is exemplified by guanidine, aminoguanidine, guanylthiourea, 1,3-diphenylguanidine, 1,3-di-o-tolylguanidine, 1-o-tolylbiguanide, polyhexamethylene biguanidine, polypentamethylene biguanidine, polypentaethylene biguanidine, polyvinyl guanidine, polyallyl biguanidine and a salt thereof. Examples of the salt include, for instance, phosphate, chloride, sulfate and organic acid salts such as acetate and gluconate. The total amount by molar ratio of the above-cited salts is preferably in the range of 0,01 as the power limit to 100 as the upper limit based on the guanidine compound and/or a salt thereof.

The mass average molecular weight of the above-mentioned guanidine compound and/or a salt thereof is in the range of 59 as lower limit to 1,000,000 as upper limit. The molecular weight can not be less than 59, since in the general formula (2) the molecular weight of guanidine which is made minimum is 59. The lower limit is preferably 300, more preferably 500. The molecular weight of 100,000 or higher brings about a fear of being insoluble in water. Hence the upper limit is preferably 100,000, more preferably 20,000.

Since the effect on imparting rust prevention properties is enhanced, the above-mentioned guanidine compound and/or its salt preferably has a biguanide structure represented by the following formula (4):

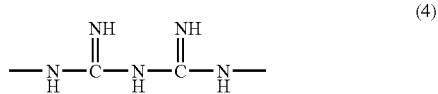

(4)

and or its salt form.

The guanidine compound bearing a biguanide structure and/or a salt thereof is not specifically limited, but is exemplified by polyhexamethylene biguanidine, 1-o-tolylbiguanide, chlorohexyldine gluconate and/or a salt thereof. The guanidine compound and/or a salt thereof may be used alone or in combination with at least one other species.

The guanidine compound and/or a salt thereof is blended in the range of 1 to 20% by mass, preferably 2 to 10% by mass based on solid components in the hydrophilization treatment agent composition.

The hydrophilization treatment agent composition is adhered to the surfaces of the aluminum-made heat exchanger in a dry amount of preferably 0,01 to 5 g/m², more preferably 0.1 to 1 g/m².

The hydrophilization treatment agent composition according to the present invention, which comprises the above-mentioned components as indispensable solid components, is used by dissolving in a solvent. The solid component concentration of the resultant solution, which is selected in a suitable range from the aspect of workability, economical efficiency and the like, is usually 1 to 10% by mass.

The solvent is not specifically limited, but is preferably composed principally of water from the viewpoint of wastewater treatment. In order to improve film forming properties and form more uniform smooth film, another solvent may be used. The solvent is not specifically limited, provided that it is generally used in coating materials and uniformly mixed with water, and is exemplified by organic solvents of alcohol base, ketone base, ester base and ether base. Preferably the amount of the solvent to be used is usually in the range of 0.01 to 5% by mass based on the hydrophilization treatment agent composition expressed in terms of solid components.

The hydrophilization treatment agent composition may further contain an other additive, which is not specifically limited, but is exemplified, for instance, by curing agents, dispersants, pigments, silane coupling agents, antimicrobial agents, surfactants, lubricants and deodorizing agents.

The above-cited curing agents are not specifically limited, but are exemplified, for instance, by melamine resin, block isocyanate compound, epoxy compounds, oxazoline compounds and carbodiimide compounds.

The above-cited dispersants are not specifically limited, but are exemplified, for instance, by surfactants and dispersed resins.

The above-cited pigments are exemplified, for instance, by various coloring pigments including inorganic pigments such as titanium dioxide ($TiO_2$), zinc oxide ($ZnO$), zirconium oxide ($ZrO$), calcium carbonate ($CaCO_3$), barium sulfate ($BaSO_4$), alumina ($Al_2O_3$), kaolin clay, carbon black, iron oxide ($Fe_2O_3$, $Fe_3O_4$, etc.), aluminum oxide ($Al_2O_3$), and organic pigments.)

The above-cited silane coupling agents are preferably contained from the viewpoint of being capable of improving affinity between the hydrophilic resin and the pigments, and enhancing the adhesiveness.

The above-cited silane coupling agents are not specifically limited, but are exemplified, for instance, by ɣ-aminopropyltrimethoxysilane, ɣ-aminopropyltriethoxysilane, ɣ-glycidoxypropyltrimethoxysilane, ɣ-methacryloxypropyltriethoxysilane and N-[2-(vinylbenzylamino) ethyl]-3-aminopropyltrimethoxysilane.

The above-cited antimicrobial agents are not specifically limited, but are exemplified, for instance, by previously well known antimicrobial agents such as 2-(4-thiazonyl)-benzimidazole and zinc pyrithion.

The effect and advantages of the present invention will be summarized as follows. The rust prevention and hydrophilization treatment method according to the present invention, which is a simplified process dispensing with a flux removal step, possesses the advantage of being free from the problem of halogen based wastewater treatment that is attributable to previous flux removal step.

In the present invention, although the use of a flux deteriorates the chemical conversion treatment properties, the flux itself protects aluminum as the parent material and prevents its oxidation, and besides a portion lacking the flux is passivated with a zirconium film or a titanium film, and further a portion lacking a zirconium film or a titanium film benefits by the rust prevention effect of guanidine compound and/or a salt thereof which is contained in the hydrophilization treatment agent composition and which covers the portion, whereby favorable rust prevention properties are exhibited in whole. Moreover, the component of the hydrophilic resin such as polyvinyl alcohol is imparted with such hydrophilicity as capable of preventing dew formation during air conditioner running and also with water-proofness enabling aluminum fins to be densely coated whereby excellent deodorization effect is assured.

In what follows, the present invention will be described in more detail with reference to working examples, which however shall never limit the present invention thereto. In the working examples and comparative examples, "%" and "part/s" stand for "% by mass" and "part/s by mass", respectively unless otherwise noted.

EXAMPLE 1

Preparation of Hydrophilization Treatment Agent Composition

A hydrophilization treatment agent composition in the form of aqueous solution was prepared by blending 0.2 part of acetic salt of polyhexamethylene biguanidine as a guanidine compound and/or a salt thereof, 1.3 part of polyvinyl alcohol (degree of saponification of 99%, number average molecular weight of 20,000) as a hydrophilic resin, 0.5 part of polyethylene oxide-modified polyvinyl alcohol (degree of saponification of 99%, modification rate of 3%, number average molecular weight of 20,000) as a hydrophilic resin and 0.2 part of silica as an inorganic cross-linking agent, while adding water thereto to make a total of 100 parts. Fabrication of heat exchanger for testing There was used as a heat exchanger, a car evaporator which had a surface area of 3 $m^2$, and which was brazed with a flux wax of $KAlF_4/K_3AlF_6$ with a flux quantity as K of 50 $mg/m^2$ (fin surface).

(a) Fluorozirconic acid was dissolved in water so that zirconium ion concentration became 250 ppm, and was regulated to pH 4 with ammonia to obtain a conversion treatment bath of zirconium, which was heated to 60° C. The above-fabricated heat exchanger was immersedly treated in the bath for 45 seconds.

(b) The surfaces of the heat exchanger subjected to conversion treatment of zirconium were washed with water at ambient temperature for 30 seconds.

(c) The heat exchanger was immersed in an aqueous solution bath of the above-prepared hydrophilization treatment agent composition at ambient temperature for 10 seconds (solid content in the bath being about 2% by mass).

(d) The heat exchanger taken out from the hydrophilization treatment bath was air blown so that the aqueous solution of the hydrophilization treatment agent composition was regulated to adhere to the surfaces in a quantity of 25 $g/m^2$ (it follows that the solid components of the composition adhered thereto in a quantity of about 0.5 $g/m^2$.

(e) The heat exchanger for testing was fabricated by baking the same in a drying furnace so that the core temperature was maintained at 140° C. for 5 minutes.

Evaluation of Physical Properties of the Heat Exchanger for Testing

Evaluations were made of corrosion resistance, hydrophilicity, persistent odor and adhered odor of the heat exchanger for testing based on the evaluation procedures as described hereunder. The results are given in Table 1.

<Corrosion Resistance>

According to JIS Z 2371, common salt water of 5% was sprayed onto the heat exchanger at 35° C., and after the lapse of 240 hours evaluations were made of white rust occurrence area by visual observation based on the under-mentioned criterion. The corrosion resistance is preferably at least mark 8.

10 no rust without any color change
9: no rust, slight color change in part
8: no rust, slight color change in whole
7: white rust occurrence (at most 5%)
6 white rust occurrence (at most 10%)
5: white rust occurrence (at most 20%)
4 white rust occurrence (at most 40%)
3: white rust occurrence (at most 60%)
2 white rust occurrence (at most 80%)
1; white rust occurrence in whole <Hydrophilicity>

The heat exchanger to be tested was brought into contact with flowing water for 72 hours, and then contact angle with a water droplet was measured by the use of an automatic contact angle meter (manufactured by Kyowa Kaimen Kagaku Co., Ltd.). It is thought that hydrophilicity increases with a decrease in contact angle. Preferably the hydrophilicity is at most 40° expressed in terms of contact angle.

<Persistent Odor>

The heat exchanger to be tested was brought into contact with flowing city water for 72 hours, and then the smell of the heat exchanger was evaluated in six stages. Preferably the persistent odor is at most 1.5.

0: no smell at all
1: very slightly smell
2: easily smell
3: clearly smell
4: strongly smell
5: extremely strongly smell <Adhered Odor>

The subject to be tested on hydrophilization treatment was brought into contact with flowing city water for 72 hours, then placed in a 50 $m^3$ conference room, and exposed in the smoke of 20 cigarettes for 3 hours. Thereafter it was placed in another 50 $m^3$ conference room free from smoke. Subsequently it was evaluated in six stages in the same manner as the persistent odor test.

EXAMPLE 2

The procedure in Example 1 was repeated to obtain a surface-treated heat exchanger except that there were used aluminum phosphate as the inorganic cross-linking agent and chlorohexydine gluconate as the guanidine compound and/or a salt thereof. Subsequently, evaluations were made of corrosion resistance, hydrophilicity and persistent odor of the heat exchanger. The results are given in Table 1.

EXAMPLE 3

The procedure in Example 1 was repeated to obtain a surface-treated heat exchanger except that there was used 1-o-tolylbiguanide as the guanidine compound and/or a salt thereof. Subsequently, evaluations were made of corrosion resistance, hydrophilicity and persistent odor of the heat exchanger. The results are given in Table 1.

EXAMPLE 4

The procedure in Example 1 was repeated to obtain a surface-treated heat exchanger except that there was used aluminum phosphate as the inorganic cross-linking agent. Subsequently, evaluations were made of corrosion resistance, hydrophilicity and persistent odor of the heat exchanger. The results are given in Table 1.

EXAMPLE 5

The procedure in Example 1 was repeated to obtain a surface-treated heat exchanger except that there was used polyvinyl alcohol having a molecular weight of 50,000. Subsequently, evaluations were made of corrosion resistance, hydrophilicity and persistent odor of the heat exchanger. The results are given in Table 1.

EXAMPLE 6

The procedure in Example 1 was repeated to obtain a surface-treated heat exchanger except that there was used fluorotitanic acid (titanium ion in an amount of 250 ppm) for the chemical conversion treatment. Subsequently, evaluations were made of corrosion resistance, hydrophilicity and persistent odor of the heat exchanger. The results are given in Table 1.

EXAMPLE 7

The procedure in Example 1 was repeated to obtain a surface-treated heat exchanger except that there was used fluorozirconic acid (zirconium ion in an amount of 250 ppm) and phosphoric acid (100 ppm) for the chemical conversion treatment. Subsequently, evaluations were made of corrosion resistance, hydrophilicity and persistent odor of the heat exchanger. The results are given in Table 1.

EXAMPLE 8

The procedure in Example 1 was repeated to obtain a surface-treated heat exchanger except that there was used fluorozirconic acid (zirconium ion in an amount of 125 ppm) and fluorotitanic acid (titanium ion in an amount of 125 ppm) for the chemical conversion treatment. Subsequently, evaluations were made of corrosion resistance, hydrophilicity and persistent odor of the heat exchanger. The results are given in Table 1.

COMPARATIVE EXAMPLE 1

The procedure in Example 1 was repeated to obtain a surface-treated heat exchanger except that there was used a vacuum brazed heat exchanger. Subsequently, evaluations were made of corrosion resistance, hydrophilicity and persistent odor of the heat exchanger. The results are given in Table 1.

COMPARATIVE EXAMPLE 2

The procedure in Example 1 was repeated to obtain a surface-treated heat exchanger except that the conversion treatment with zirconium was omitted. Subsequently, evaluations were made of corrosion resistance, hydrophilicity and persistent odor of the heat exchanger. The results are given in Table 1.

COMPARATIVE EXAMPLE 3

The procedure in Example 1 was repeated to obtain a surface-treated heat exchanger except that a guanidine compound and/or a salt thereof were not used. Subsequently, evaluations were made of corrosion resistance, hydrophilicity and persistent odor of the heat exchanger. The results are given in Table 1.

COMPARATIVE EXAMPLE 4

The procedure in Example 1 was repeated to obtain a surface-treated heat exchanger except that the polyethylene oxide-modified polyvinyl alcohol (degree of saponification; 99%, polyethylene oxide modification rate; 3%, molecular weight; 20,000) was not used. Subsequently, evaluations were made of corrosion resistance, hydrophilicity and persistent odor of the heat exchanger. The results are given in Table 1.

COMPARATIVE EXAMPLE 5

The procedure in Example 1 was repeated to obtain a surface-treated heat exchanger except that the blending ratio of polyvinyl alcohol (molecular weight; 20,000) was set on 0.2 parts. Subsequently, evaluations were made of corrosion resistance, hydrophilicity and persistent odor of the heat exchanger. The results are given in Table 1.

COMPARATIVE EXAMPLE 6

The procedure in Example 1 was repeated to obtain a surface-treated heat exchanger except that an inorganic cross-linking agent was not used. Subsequently, evaluations were made of corrosion resistance, hydrophilicity and persistent odor of the heat exchanger. The results are given in Table 1.

TABLE 1

|  | Examples | | | | | | | |
|---|---|---|---|---|---|---|---|---|
|  | 1 | 2 | 3 | 4 | 5 | 6 | 7 | 8 |
| Heat exchanger for testing | | | | | | | | |
| flux brazed | ○ | ○ | ○ | ○ | ○ | ○ | ○ | ○ |
| vacuum brazed | — | — | — | — | — | — | — | — |
| Chemical conversion treatment bath | | | | | | | | |
| Zirconium ion (ppm) | 250 | 250 | 250 | 250 | 250 | — | 250 | 125 |
| Titanium ion (ppm) | — | — | — | — | — | 250 | — | 125 |
| Phosphoric acid (ppm) | — | — | — | — | — | — | 100 | — |
| Hydrophilization treatment bath | | | | | | | | |
| (1) PVA (%) degree of saponification: 98% molecular weight (MW): 20000 | 1.3 | 1.3 | 1.3 | 1.3 | | 1.3 | 1.3 | 1.3 |
| PVA (%) degree of saponification: 98% MW: 50000 | | | | | 1.3 | | | |
| (2) PEO modified PVA (%) MW: 20000 | 0.5 | 0.5 | 0.5 | 0.5 | 0.5 | 0.5 | 0.5 | 0.5 |
| (3) Silica (%) | 0.2 | | 0.2 | | 0.2 | 0.2 | 0.2 | 0.2 |
| Aluminum phosphate (%) | | 0.2 | | 0.2 | | | | |
| (4) Polyhexamethylene biguanidine (%) | 0.2 | | | 0.2 | 0.2 | 0.2 | 0.2 | 0.2 |
| Chlorohexyldine gluconate (%) | | 0.2 | | | | | | |
| 1-o-tolylbiguanide (%) | | | 0.2 | | | | | |
| Corrosion resistance | 9 | 8.5 | 8.5 | 9 | 9 | 8.5 | 9 | 9.5 |
| Hydrophilicity | 28 | 28 | 28 | 30 | 30 | 28 | 28 | 28 |

TABLE 1-continued

|  |  |  |  |  |  |  |  |  |
|---|---|---|---|---|---|---|---|---|
| Persistent odor | 1 | 1 | 1 | 1 | 1 | 1 | 1 | 1 |
| Adhered odor | 1.5 | — | — | — | — | — | — | — |

|  | Comparative Examples |  |  |  |  |  |
|---|---|---|---|---|---|---|
|  | 1 | 2 | 3 | 4 | 5 | 6 |
| Heat exchanger for testing |  |  |  |  |  |  |
| flux brazed | — | ○ | ○ | ○ | ○ | ○ |
| vacuum brazed | ○ | — | — | — | — | — |
| Chemical conversion treatment bath |  |  |  |  |  |  |
| Zirconium ion (ppm) | 250 | — | 250 | 250 | 250 | 250 |
| Titanium ion (ppm) | — | — | — | — | — | — |
| Phosphoric acid (ppm) | — | — | — | — | — | — |
| Hydrophilization treatment bath |  |  |  |  |  |  |
| (1) PVA (%) |  |  |  |  |  |  |
| degree of saponification: 98% | 1.3 | 1.3 | 1.3 | 1.8 | 0.2 | 1.3 |
| molecular weight (MW): 20000 |  |  |  |  |  |  |
| PVA (%) |  |  |  |  |  |  |
| degree of saponification: 98% |  |  |  |  |  |  |
| MW: 50000 |  |  |  |  |  |  |
| (2) PEG modified PVA (%) | 0.5 | 0.5 | 0.5 |  | 1.6 | 0.5 |
| MW: 20000 |  |  |  |  |  |  |
| (3) Silica (%) | 0.2 | 0.2 | 0.2 | 0.2 | 0.2 |  |
| Aluminum phosphate (%) |  |  |  |  |  |  |
| (4) Polyhexamethylene biguanidine (%) | 0.2 | 0.2 |  | 0.2 | 0.2 | 0.2 |
| Chlorohexyldine gluconate (%) |  |  |  |  |  |  |
| 1-o-tolylbiguanide (%) |  |  |  |  |  |  |
| Corrosion resistance | 4 | 7 | 5 | 9 | 8.5 | 9 |
| Hydrophilicity | 28 | 28 | 28 | 52 | 28 | 48 |
| Persistent odor | 1 | 1.5 | 1 | 1 | 2.5 | 1 |
| Adhered odor | — | — | — | — | — | 3 |

What is claimed is:

1. A rust prevention and hydrophilization treatment method for a flux-brazed aluminum-made heat exchanger which comprises subjecting the heat exchanger to a rust prevention treatment by the use of a zirconium base compound and/or a titanium base compound, and thereafter subjecting the heat exchanger to a hydrophilization treatment by means of a hydrophilization treatment agent composition, said composition comprising:

(1) 40 to 90% by mass of polyvinyl alcohol having a degree of saponification of at least 90%;

(2) 3 to 40% by mass of polyoxyalkylene-modified polyvinyl alcohol in which 0.01 to 20% of pendant groups of the polyvinyl alcohol are polyoxyalkylene ether groups represented by the general formula (1):

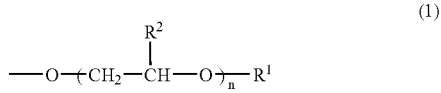

(1)

wherein n is an integer from 1 to 500, $R^1$ is a hydrogen atom or an alkyl group having 1 to 4 carbon atoms, and $R^2$ is a hydrogen atom or a methyl group;

(3) 1 to 30% by mass of an inorganic cross-linking agent which reacts with hydroxyl groups of the polyvinyl alcohol and modified polyvinyl alcohol; and (4) 1 to 20 % by mass of a guanidine compound having a biguanide structure, represented by the general formula (4), and/or a salt thereof:

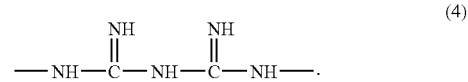

(4)

2. The rust prevention and hydrophilization treatment method according to claim 1, wherein the coating weight of said hydrophilization treatment agent composition is in the range of 0.01 to 5 g/m².

3. The rust prevention and hydrophilization method according to claim 1, wherein said flux-brazed heat exchanger subjected to the rust prevention treatment and the hydrophilization treatment is subjected to the rust prevention treatment and the hydrophilization treatment without removing flux prior to the rust prevention and hydrophilization treatments.

4. The rust prevention and hydrophilization treatment method according to claim 1, wherein the guanidine compound has a mass average molecular weight of 500 to 1,000,000.

5. The rust prevention and hydrophilization treatment method according to claim 1, wherein the mass average molecular weight of the guanidine compound is 500 to 20,000.

6. The rust prevention and hydrophilization treatment method according to claim 1, wherein the guanidine compound is at least one selected from the group consisting of 1-o-tolylbiguanide, polyhexamethylene biguanidine, polypentamethylene biguanidine, polypentaethylene biguanidine, polyvinyl guanidine, polyallyl biguanidine and salts thereof and chlorohexyldine gluconate.

7. The rust prevention and hydrophilization treatment method according to claim 6, wherein the guanidine compound is at least one selected from the group consisting of 1-o-tolylbiguanide, polyhexamethylene biguanidine, and chlorohexyldine gluconate.

8. The rust prevention and hydrophilization treatment method according to claim 1, wherein the hydrophilization treatment agent composition is adhered to surfaces of the aluminum-made heat exchanger in a dry amount of 0.1 to 1 g/m$^2$.

9. The rust prevention and hydrophilization treatment method according to claim 1, wherein said hydrophilization treatment agent composition includes 2 to 10% by mass of said guanidine compound.

* * * * *